July 29, 1924.
S. G. BARNSTEAD
1,503,015
RECEPTACLE COVER
Filed Feb. 1, 1923
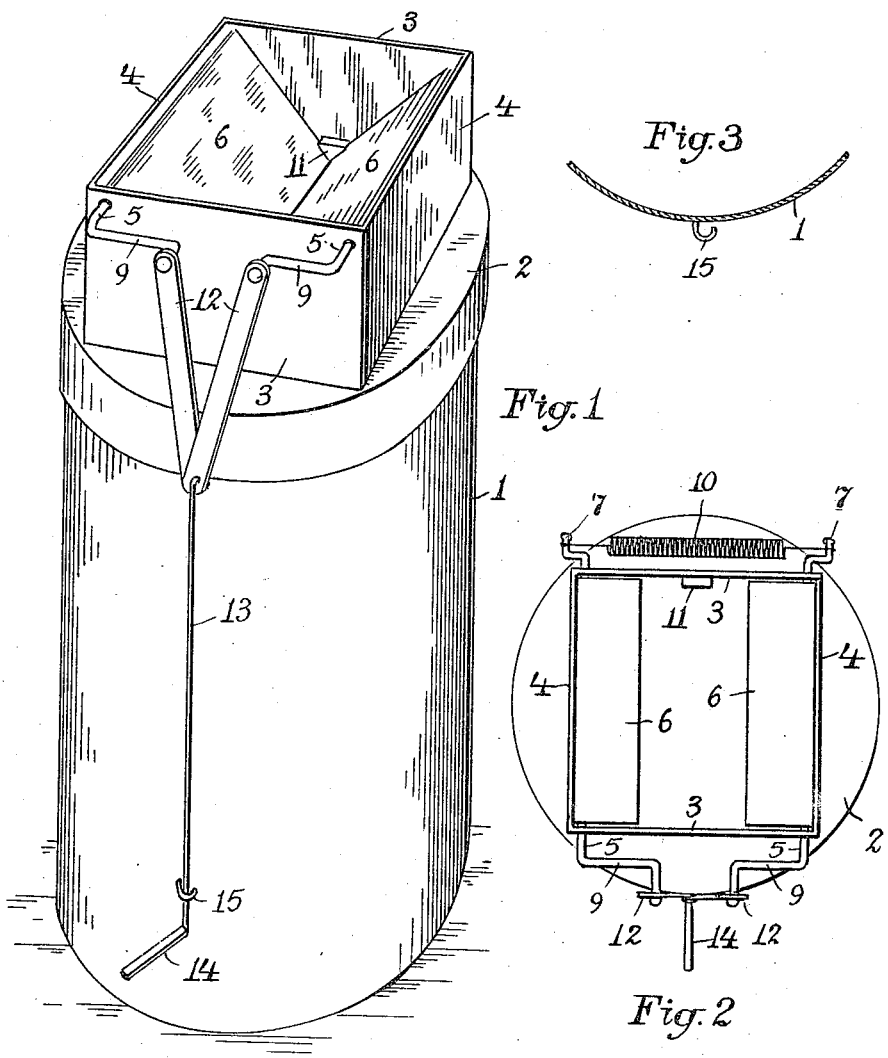
Inventor,
Sidney G. Barnstead;
By A.B. Upham,
Attorney.

Patented July 29, 1924.

1,503,015

UNITED STATES PATENT OFFICE.

SIDNEY G. BARNSTEAD, OF CAMBRIDGE, MASSACHUSETTS.

RECEPTACLE COVER.

Application filed February 1, 1923. Serial No. 616,273.

*To all whom it may concern:*

Be it known that I, SIDNEY G. BARNSTEAD, a citizen of the United States, and a resident of Cambridge, in the county of Middlesex and Commonwealth of Massachusetts, have invented certain new and useful Improvements in Receptacle Covers, of which the following is a full, clear, and exact specification.

The object of this invention is the construction of a cover for cans receiving garbage, ashes and the like, which can be instantly opened by the touch of the foot, and will automatically close.

In the drawings forming part of this specification, Fig. 1 is a perspective view of a garbage can provided with a cover embodying my invention. Fig. 2 is a plan view of the same. Fig. 3 is a detail view of the guide for the lower portion of the operating rod. Fig. 4 is a sectional side view of another form of the invention.

The can 1 is of any well known form, such as are ordinarily made of metal and cylindrical in shape. Fitted to the top of this can is a cover-body 2, and rising from the latter are four rectangular walls 3, 4 the space between which opens through the top of the cover, so that whatever is dumped between the walls descends unhindered into the can. Hinged by means of trunnions 5 to the two walls 3 are two trap doors 6, each of the trunnions being extended and bent to compose crank arms 7 and 9, the cranks 7 being drawn toward each other by a tension spring 10 which draws the free edges of the trap doors snugly together and thereby closes the can. These crank arms 7 and spring 10 are shown in Fig. 2. A lug 11 projecting from the walls 3 prevents the trap doors from swinging inward too far.

For opening the trap doors 6, links 12 are pivotally attached to the crank arms 9 and at their opposite ends are pivotally united to the upper end of an operating rod 13, whereby a downward pull given to this rod causes the trap doors to be swung apart until flat against the walls 4. At the lower end of this rod is a foot-piece 14 upon which the pressure of a foot will pull the rod downward and separate the trap doors 6.

The rod 13 passes through an eye 15 for retaining it in place, this eye being open at one side to enable the rod to be released therefrom when the cover is to be removed from the can for the purpose of emptying the latter.

Where the can must be left where it will receive rain, it is well to have the trap-doors 6 disposed as shown in Fig. 4 so that their meeting edges are above instead of below the trunnions, and thereby shed the rain and snow like the roof of a house. In this construction, the walls 16 are correspondingly shaped to support the trap doors when closed. Otherwise the construction and operation are the same as above described, except that the walls 4 need not be so high.

What I claim is:

1. A receptacle cover comprising a member for the open top of the receptacle having a rectangular opening through it, four walls rising from the edges of said opening, two trap doors hinged close to opposite walls, resilient means connected with said doors to urge their free edges together, the width of said doors being in excess of the distance between their hinges to render them angularly disposed relative to each other, and means operated by the foot for separating said edges.

2. A receptacle cover comprising a flat removable top for the receptacle having a rectangular opening through it, four walls rising from the edges of said opening, two trap doors each having a trunnion at each end, each trunnion having a crank arm exterior of said walls, a helical spring terminally attached to two corresponding crank arms of the two doors for pressing their free edges toward each other, two links connected with the other crank arms, a rod pivotally uniting the lower ends of said links and having a foot piece at its lower end, and a partially opened eye for releasably holding the lower portion of said rod.

In testimony that I claim the foregoing invention, I have hereunto set my hand this 30th day of January, 1923.

SIDNEY G. BARNSTEAD.